US012731445B2

(12) United States Patent
Rhodig et al.

(10) Patent No.: US 12,731,445 B2
(45) Date of Patent: Sep. 8, 2026

(54) SYSTEM FOR DETERMINING DAMPER VELOCITY IN A SOLID AXLE SUSPENSION

(71) Applicant: GM Global Technology Operations LLC, Detroit, MI (US)

(72) Inventors: Joshua Rhodig, Brighton, MI (US); Bart Ruc, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 18/819,207

(22) Filed: Aug. 29, 2024

(65) Prior Publication Data

US 2026/0065721 A1 Mar. 5, 2026

(51) Int. Cl.
*G07C 5/04* (2006.01)

(52) U.S. Cl.
CPC .................................... *G07C 5/04* (2013.01)

(58) Field of Classification Search
CPC G07C 5/04; B60G 2200/30; B60G 2204/128; B60G 2204/129; B60G 2400/20; B60G 17/018; B60G 17/01933; B60G 17/06; B60G 2400/202; B60G 2400/252; B60G 2500/10; B60G 2800/70; B60G 17/019
USPC .......................................... 701/1, 29.1, 32.1
See application file for complete search history.

(56) References Cited

U.S. PATENT DOCUMENTS 12,103,347 B2 * 10/2024 Furuta ................ B60G 17/0165
12,371,004 B2 * 7/2025 Matsuno ............. B60W 30/045
2003/0182036 A1 * 9/2003 Shal .......................... F16F 9/48 280/5.515
2003/0195683 A1 * 10/2003 Oakley ............. B60G 17/0152 701/37
2010/0131154 A1 * 5/2010 Moshchuk ........... B60G 17/018 702/41

(Continued)

FOREIGN PATENT DOCUMENTS

DE 112020007542 T5 8/2023
GB 2643400 A * 2/2026 ........... B60W 10/22

OTHER PUBLICATIONS

"Robust Control of Acive Suspension", MathWorks, captured Apr. 25, 2024, Access via WayBack Machine, https://web.archive.org/web/20240425060218/https://www.mathworks.com/help/robust/gs/active-suspension-control-design.html. (Year: 2024).*

*Primary Examiner* — Wade Miles
*Assistant Examiner* — Sidney Leigh Molnar
(74) *Attorney, Agent, or Firm* — Vivacqua Crane, PLLC

(57) ABSTRACT

A system for determining a damper velocity in solid axle suspension for a vehicle includes a solid axle, a pair of dampers corresponding to a left wheel and a right wheel of the vehicle, and a pair of distance sensors. The pair of distance sensors each generate sensor signals that are indicative of respective distances between respective portions of the frame of the vehicle and the solid axle. The system also includes one or more controllers in electronic communication with the pair of distance sensors. The one or more controllers access a pair of three-dimensional look-up tables that each correspond to one of the dampers of the pair of dampers, wherein each three-dimensional look-up table defines a relationship between the respective distances measured by the pair of distance sensors and the respective damper length of each damper.

20 Claims, 7 Drawing Sheets

(56) References Cited

U.S. PATENT DOCUMENTS

| | | | | |
|---|---|---|---|---|
| 2010/0225527 | A1* | 9/2010 | Talty | F16F 9/3292<br>290/1 R |
| 2015/0231942 | A1* | 8/2015 | Trangbaek | F16F 15/022<br>267/195 |
| 2016/0031286 | A1* | 2/2016 | Kubota | B60G 17/018<br>701/37 |
| 2017/0158015 | A1* | 6/2017 | Kubota | B60G 17/018 |
| 2017/0240017 | A1* | 8/2017 | Vandersmissen | B60G 17/06 |
| 2017/0282667 | A1* | 10/2017 | Yoon | B60G 17/01908 |
| 2018/0361816 | A1* | 12/2018 | Ohno | B60G 17/0165 |
| 2020/0062269 | A1* | 2/2020 | Vardharajan | B60W 50/0098 |
| 2020/0307339 | A1* | 10/2020 | Ohno | B60G 17/0165 |
| 2020/0324603 | A1* | 10/2020 | Ohno | B60G 17/018 |
| 2020/0324605 | A1* | 10/2020 | Ohno | B60G 17/016 |
| 2021/0033494 | A1* | 2/2021 | Oblizajek | F16F 9/532 |
| 2021/0101434 | A1* | 4/2021 | Sawarynski, Jr. | B60G 17/0152 |
| 2022/0088987 | A1* | 3/2022 | Otten | B60G 17/019 |
| 2022/0234408 | A1* | 7/2022 | Jonson | B60G 17/016 |
| 2022/0234410 | A1* | 7/2022 | Jonson | B60G 17/0165 |
| 2022/0297495 | A1* | 9/2022 | Sawarynski | B60G 17/0165 |
| 2023/0213081 | A1* | 7/2023 | Michener | B60G 13/08<br>188/266.1 |
| 2023/0278539 | A1* | 9/2023 | Otten | B60W 10/184<br>701/70 |
| 2024/0217299 | A1* | 7/2024 | Ono | B60G 17/0185 |

* cited by examiner

SYSTEM FOR DETERMINING DAMPER VELOCITY IN A SOLID AXLE SUSPENSION

INTRODUCTION

The present disclosure relates to a system for determining damper velocity in a solid axle suspension.

A beam or solid axle refers to a suspension design where a single beam or shaft connects the left and the right wheels of a vehicle together. An active damper refers to a damper that exerts an independent force upon the suspension of a vehicle to improve the ride comfort. A semi-active damper refers to a damper that may change the viscous damping coefficient of the damper, however, unlike an active damper a semi-active damper is unable to add energy to the suspension of a vehicle. If the position of the damper is known, then the velocity of the damper may be determined by deriving the position with respect to time. It is to be appreciated that an understanding of the damper's velocity at any instance during a vehicle's operation is required for purposes of determining system as well as vehicle level performance.

Vehicles equipped with a solid rear axle behave differently when compared to an independent rear suspension. Accordingly, there are unique challenges that are faced when determining the position and velocity of a damper in a vehicle equipped with a solid rear axle. For example, the solid rear axle of a vehicle may either hop or tramp. Wheel hop refers to when both the rear wheels of the solid rear axle move in the same direction and velocity, while tramp refers to when the left and right wheels move in different directions and/or at different velocities. Thus, the velocity of the damper corresponding to the left wheel of a vehicle equipped with a solid rear axle may not be calibrated in the same manner as the velocity of the damper corresponding to the right wheel of the vehicle. In addition to wheel hop and tramp, most solid rear axles also include left and right dampers that are splayed non-symmetrically with respect to one another in all three axes of the vehicle coordinate system. The splayed dampers further exacerbate the challenges faced when attempting to determine the velocity of a damper for a vehicle equipped with a solid rear axle.

Thus, while current solid rear axles achieve their intended purpose, there is a need in the art for determining the velocity of a damper for vehicles equipped with a solid rear axle.

SUMMARY

According to several aspects, a system for determining a damper velocity in solid axle suspension for a vehicle including a frame is disclosed. The system includes a solid axle connecting a left wheel and a right wheel of the vehicle together and a pair of dampers corresponding to the left wheel and the right wheel of the vehicle, where each damper defines a respective damper length. The system also includes a pair of distance sensors that each correspond to the left wheel and the right wheel of the vehicle, where the pair of distance sensors each generate sensor signals that are indicative of respective distances between respective portions of the frame of the vehicle and the solid axle. The system also includes one or more controllers in electronic communication with the pair of distance sensors. The one or more controllers access a pair of three-dimensional look-up tables that each correspond to one of the dampers of the pair of dampers, where each three-dimensional look-up table defines a relationship between the respective distances measured by the pair of distance sensors and the respective damper length of each damper. The one or more controllers include one or more processors that execute instructions to receive, from the pair of distance sensors, the sensor signals indicating the respective distances between the frame of the vehicle and the solid axle. In response to receiving the sensor signals, the one or more controllers locate a value on each of the pair of three-dimensional look-up tables, where the value represents a respective damper length of one of the dampers corresponding to the respective distances measured by the pair of distance sensors and derive the respective damper length of each damper with respect to time to determine a velocity corresponding to each damper.

In another aspect, each three-dimensional look-up table is determined based on a kinematic study where the solid axle suspension is in a curb position, a compression position, and a rebound position of the vehicle.

In yet another aspect, the kinematic study includes holding either a wheel assembly corresponding to the left wheel or the wheel assembly corresponding to the right wheel of the vehicle stationary while a remaining wheel assembly is articulated through an entire range of motion corresponding to the remaining wheel assembly at predefined distance increments.

In an aspect, the predefined distance increments are about ten millimeters.

In another aspect, the curb position of the vehicle represents a position of the solid axle suspension when the vehicle is at rest on level ground with a full tank of fuel, zero payload, and no passengers.

In yet another aspect, the pair of dampers are fully compressed and the respective damper length corresponding to each damper is at a minimum value when the vehicle is in the curb position.

In an aspect, the pair of dampers are both fully expanded and the respective damper length corresponding to each damper is at a maximum value in the rebound position.

In another aspect, the pair of dampers are splayed non-symmetrically with respect to one another in an x-axis, a y-axis, and a z-axis of a vehicle coordinate system of the vehicle.

In yet another aspect, the pair of distance sensors include one of the following: rotary height sensors, linear distance sensors, optical distance sensors, and accelerometers.

In an aspect, the pair of dampers include one of the following: active dampers and semi-active dampers.

In another aspect, the solid axle connects rear wheels of the vehicle together.

In an aspect, a method for determining a damper velocity in solid axle suspension for a vehicle including a frame. The method includes method receiving, by one or more controllers, sensor signals indicating respective distances between the frame of the vehicle and a solid axle from a pair of distance sensors, where the pair of distance sensors each correspond to a left wheel and a right wheel of the vehicle, and a pair of dampers correspond to the left wheel and the right wheel of the vehicle. Each damper defines a respective damper length. In response to receiving the sensor signals, the method includes locating, by the one or more controllers, a value on each of a pair of three-dimensional look-up tables, where the value represents a respective damper length of one of the dampers corresponding to the respective distances measured by the pair of distance sensors, where each three-dimensional look-up table defines a relationship between the respective distances measured by the pair of distance sensors and the respective damper length of each damper. The method includes deriving, by the one or more controllers, the respective damper length of each damper with respect to time to determine a velocity corresponding to each damper.

In yet another aspect, a system for determining a damper velocity in solid axle suspension for a vehicle including a frame is disclosed. The method includes a solid axle connecting a left rear wheel and a right rear wheel of the vehicle together, and a pair of dampers corresponding to the left rear wheel and the right rear wheel of the vehicle, where each damper defines a respective damper length. The system also includes a pair of distance sensors that each correspond to the left rear wheel and the right rear wheel of the vehicle, where the pair of distance sensors each generate sensor signals that are indicative of respective distances between respective portions of the frame of the vehicle and the solid axle. The system includes one or more controllers in electronic communication with the pair of distance sensors, where the one or more controllers access a pair of three-dimensional look-up tables that each correspond to one of the dampers of the pair of dampers, where each three-dimensional look-up table defines a relationship between the respective distances measured by the pair of distance sensors and the respective damper length of each damper, and each three-dimensional look-up table is determined based on a kinematic study where the solid axle suspension is in a curb position, a compression position, and a rebound position of the vehicle. The one or more controllers include one or more processors that execute instructions to receive, from the pair of distance sensors, the sensor signals indicating the respective distances between the frame of the vehicle and the solid axle. In response to receiving the sensor signals, the one or more controllers locate a value on each of the pair of three-dimensional look-up tables, where the value represents a respective damper length of one of the dampers corresponding to the respective distances measured by the pair of distance sensors. The one or more controllers derive the respective damper length of each damper with respect to time to determine a velocity corresponding to each damper.

In another aspect, the kinematic study includes holding either a wheel assembly corresponding to the left rear wheel or the wheel assembly corresponding to the right rear wheel of the vehicle stationary while a remaining wheel assembly is articulated through an entire range of motion corresponding to the remaining wheel assembly at predefined distance increments.

In yet another aspect, the predefined distance increments are about ten millimeters.

In an aspect, the curb position of the vehicle represents a position of the solid axle suspension when the vehicle is at rest on level ground with a full tank of fuel, zero payload, and no passengers.

In another aspect, the pair of dampers are fully compressed and the respective damper length corresponding to each damper is at a minimum value when the vehicle is in the curb position.

In yet another aspect, the pair of dampers are both fully expanded and the respective damper length corresponding to each damper is at a maximum value in the rebound position.

In an aspect, the pair of dampers are splayed non-symmetrically with respect to one another in an x-axis, a y-axis, and a z-axis of a vehicle coordinate system of the vehicle.

In another aspect, the pair of distance sensors include one of the following: rotary height sensors, linear distance sensors, optical distance sensors, and accelerometers.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
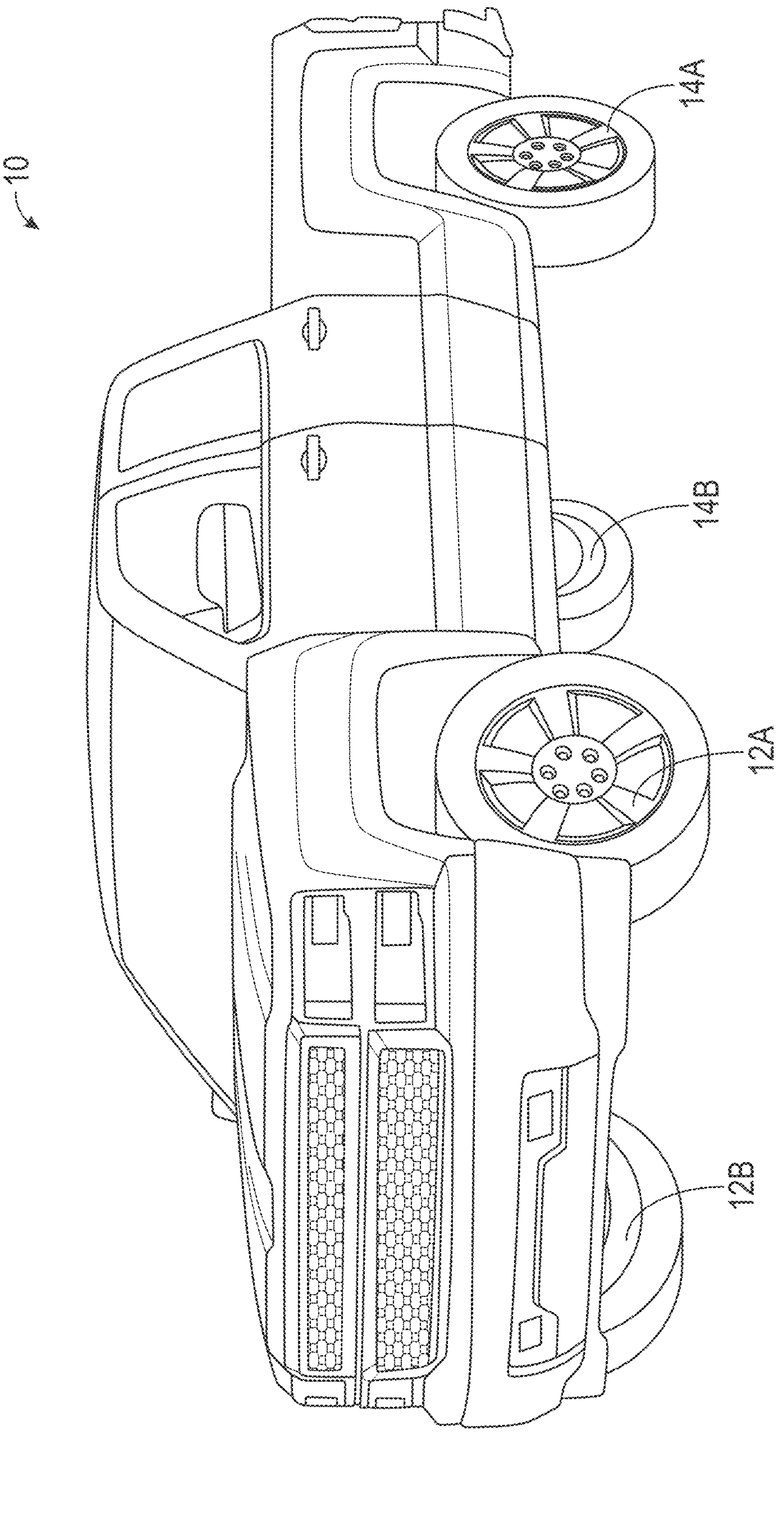
FIG. 1 is a perspective view of an exemplary vehicle including a set of front wheels and a set of rear wheels, according to an exemplary embodiment.
Figure 2:
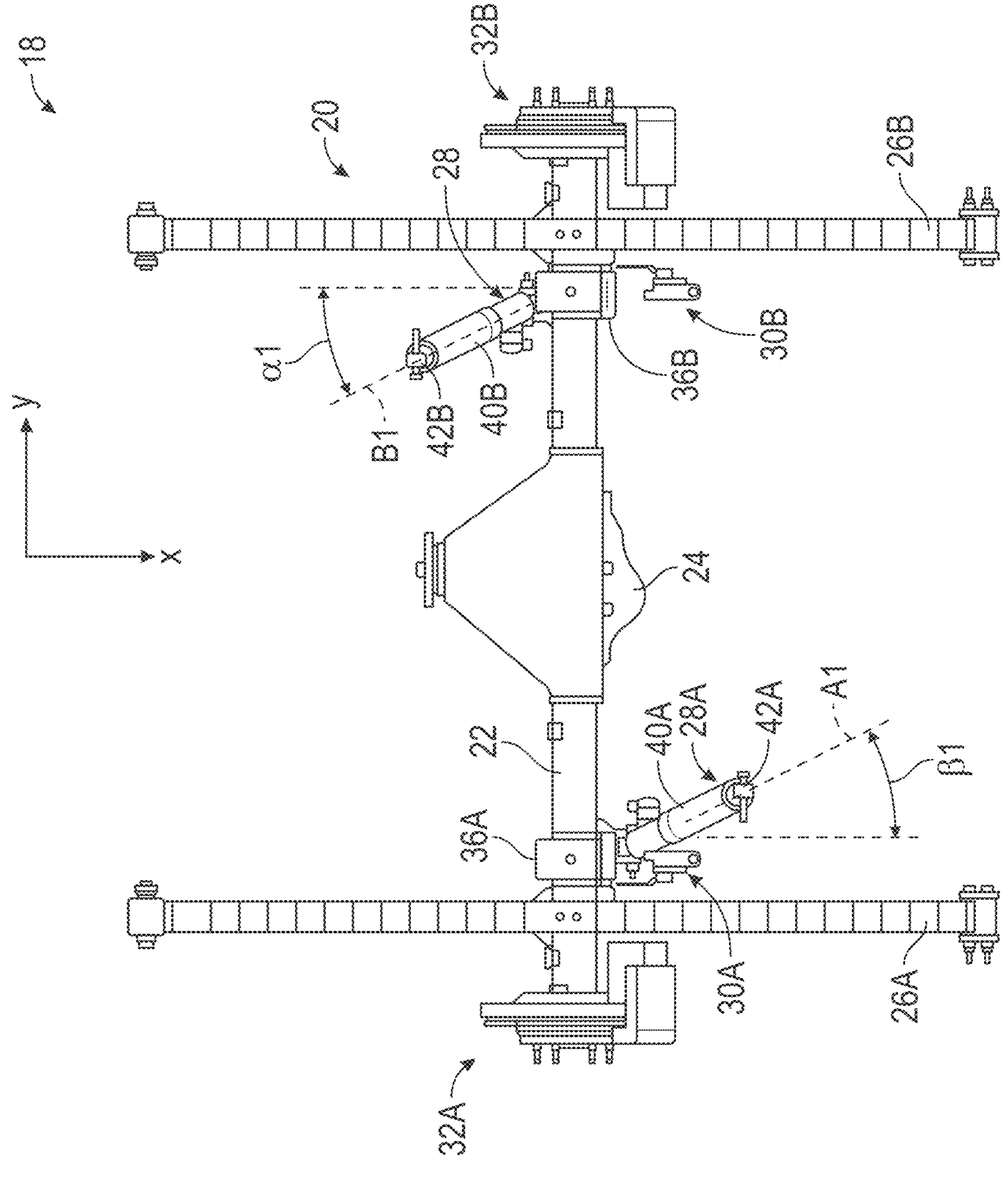
FIG. 2 is a top view of an exemplary solid axle suspension including a solid axle for connecting the rear wheels of the vehicle shown in FIG. 1 together, according to an exemplary embodiment.
Figure 3:
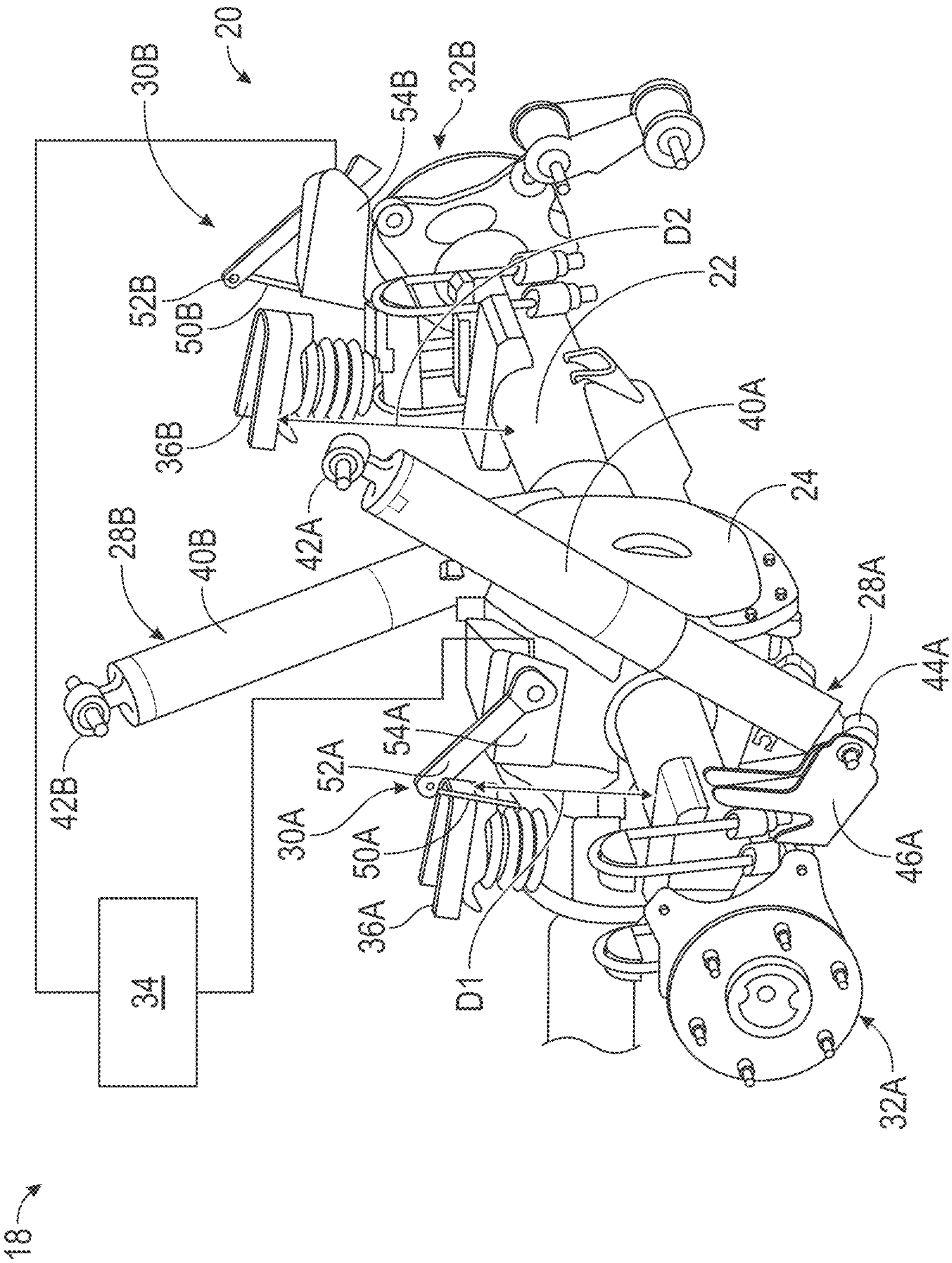
FIG. 3 is a perspective view of the solid axle suspension shown in FIG. 2 including one or more controllers in electronic communication with a pair of position sensors, according to an exemplary embodiment.

Referring to FIG. 1, a vehicle 10 including left and right front wheels 12A, 12B and left and right rear wheels 14A, 14B is illustrated. FIG. 2 is a top view of a system 18 including an exemplary solid axle suspension 20 associated with the rear wheels 14A, 14B of the vehicle 10 shown in FIG. 1, and FIG. 3 is a perspective view of the solid axle suspension 20 shown in FIG. 2. In the non-limiting embodiment as shown in FIG. 1, the vehicle 10 is a truck. However, it is to be appreciated that the vehicle 10 may be any type of vehicle such as, but not limited to, a sedan, sport utility vehicle, van, motor home, a commercial vehicle, or a farm vehicle.

Referring to FIGS. 1, 2, and 3, the system 18 includes a solid axle 22, a differential 24, a pair of biasing members 26A, 26B (visible in FIG. 2) corresponding to the left and right rear wheels 14A, 14B of the vehicle 10, a pair of dampers 28A, 28B corresponding to the left and right rear wheels 14A, 14B of the vehicle 10, a pair of distance sensors 30A, 30B (FIG. 3) each corresponding to the left and right rear wheels 14A, 14B of the vehicle 10, a pair of wheel assemblies 32A, 32B corresponding to the left and right rear wheels 14A, 14B of the vehicle 10, and one or more controllers 34 (FIG. 3) in electronic communication with the pair of distance sensors 30A, 30B. Although the rear wheels 14A, 14B are described with respect to the solid axle suspension 20 shown in the figures, it is to be appreciated that the solid axle suspension 20 is not limited to the rear wheels of a vehicle and may be used for the front wheels of a vehicle as well.

The differential 24 couples to a powertrain (not shown) of the vehicle 10 and distributes driving torque to the rear wheels 14A, 14B (FIG. 1). The biasing members 26A, 26B (FIG. 2) connect the solid axle 22 to a respective portion of a frame 36A, 36B of the vehicle 10, where the portion of the frame 36A corresponds to the left rear wheel 14A and the portion of the frame 36B corresponds to the right rear wheel 14B. In the non-limiting embodiment as shown in FIG. 2, the biasing members 26A, 26B are illustrated as leaf springs, however, it is to be appreciated that the solid axle suspension 20 is not limited to leaf springs. For example, in another embodiment, the biasing members 26A, 26B may be coil springs or air springs instead.

Figure 4:
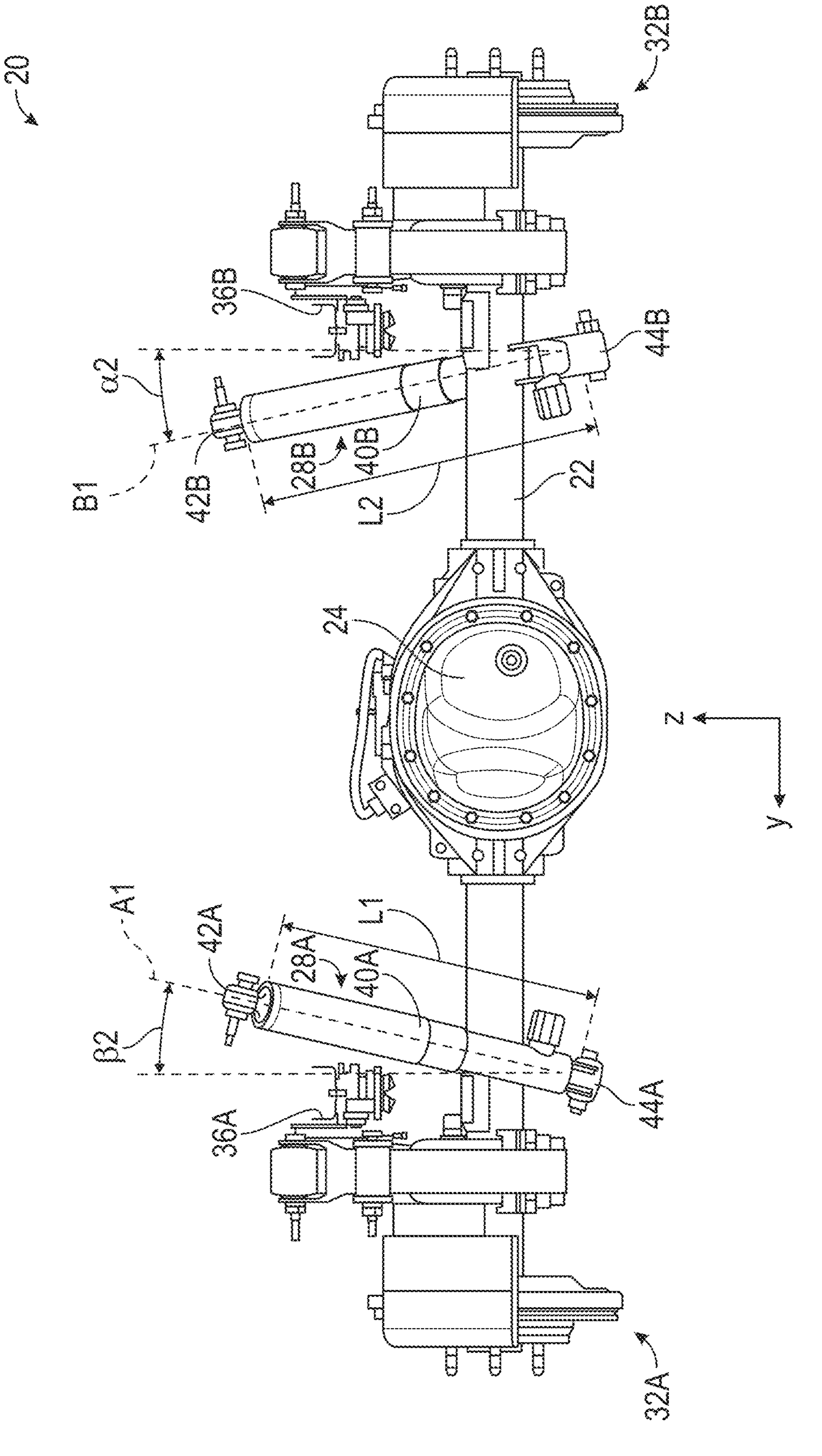
FIG. 4 is a rear view of the solid axle suspension, according to an exemplary embodiment.
Figure 5:
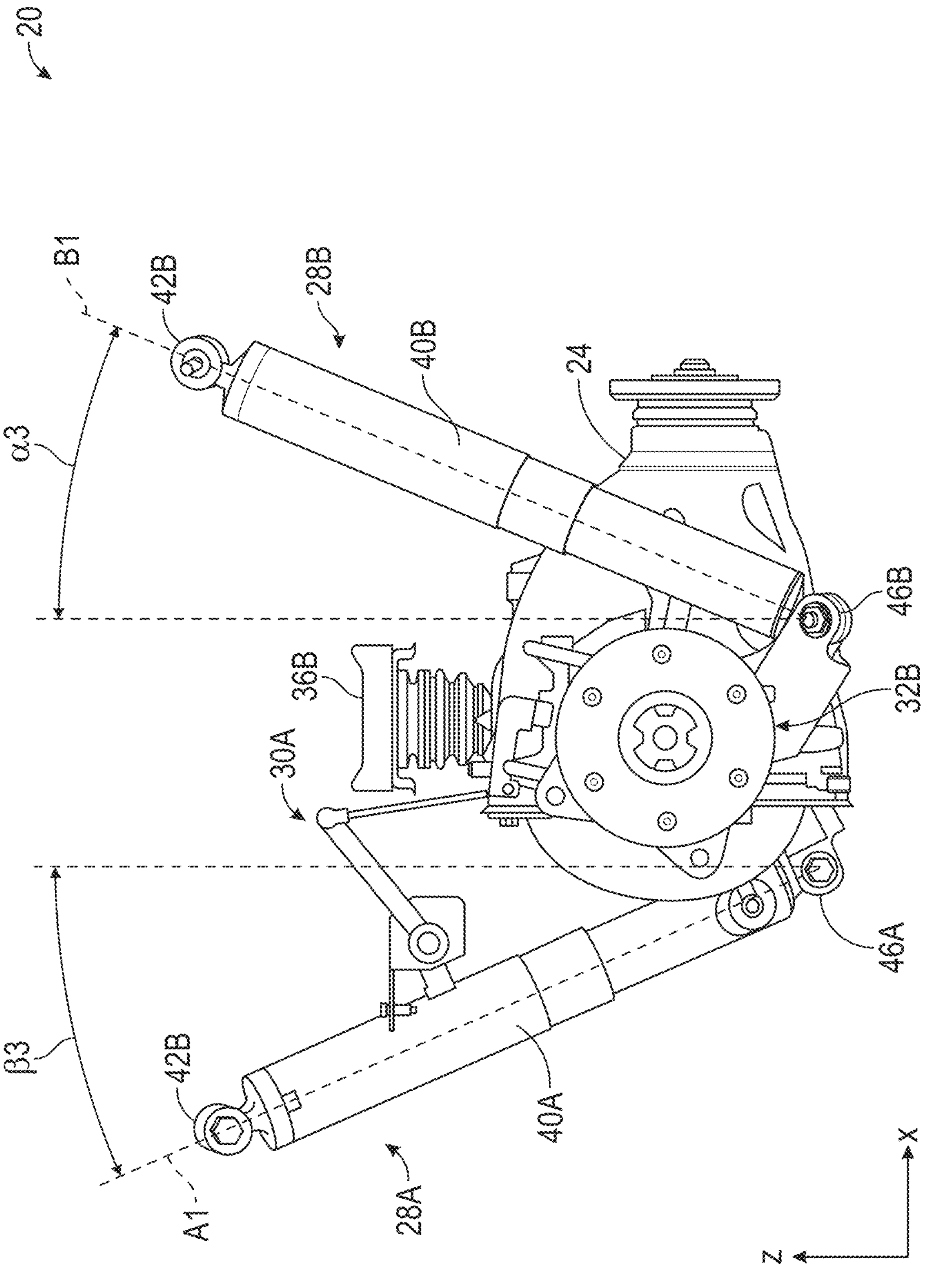
FIG. 5 is a side view of the solid axle suspension, according to an exemplary embodiment.

FIG. 4 is a rear view of the solid axle suspension 20 and FIG. 5 is a side view of the solid axle suspension 20. Referring to FIGS. 2-5, the dampers 28A, 28B each include a telescoping body 40A, 40B, an upper mount 42A, 42B, and a lower mount 44A, 44B (the lower mounts 44A, 44B are both visible in FIGS. 4 and 5). The lower mount 44A, 44B of each damper 28A, 28B connects to a wheel hub 46A, 46B (visible in FIGS. 4 and 5) of a corresponding wheel assembly 32A, 32B. The dampers 28A, 28B may be active dampers or semi-active dampers.

In the embodiment as shown in the figures, the pair of dampers 28A, 28B are splayed non-symmetrically with respect to one another in all three axes (the x-axis, the y-axis, and the z-axis) of the vehicle coordinate system corresponding to the vehicle 10. Specifically, as seen in FIG. 2, an angle $\beta 1$ measured between the x-axis of the vehicle coordinate system and an axis of symmetry A1 of the damper 28A corresponding to the left rear wheel 14A (FIG. 1) of the vehicle 10 is not equal to an angle $\alpha 1$ measured between the x-axis of the vehicle coordinate system and an axis of symmetry B1 of the damper 28B corresponding to the right rear wheel 14B of the vehicle 10. Similarly, as seen in FIG. 4, an angle $\beta 2$ measured between the z-axis of the vehicle coordinate system and the axis of symmetry A1 of the damper 28A corresponding to the left rear wheel 14A of the vehicle 10 is not equal to an angle $\alpha 2$ measured between the x-axis of the vehicle coordinate system and the axis of symmetry B1 of the damper 28B corresponding to the right rear wheel 14B of the vehicle 10. As seen in FIG. 5, an angle $\beta 3$ measured between the y-axis of the vehicle coordinate system and the axis of symmetry A1 of the damper 28A corresponding to the left rear wheel 14A of the vehicle 10 is not equal to an angle $\alpha 3$ measured between the y-axis of the vehicle coordinate system and the axis of symmetry B1 of the damper 28B corresponding to the right rear wheel 14B of the vehicle 10. However, it is to be appreciated that the pair of dampers 28A, 28B are not limited to the arrangement shown in the figures, and the dampers 28A, 28B may be positioned symmetrically with respect to one another in any of the three axes of the vehicle coordinate system as well.

Referring to FIG. 3, in the non-limiting embodiment as shown the distance sensors 30A, 30B are rotary height sensors including a respective link 50A, 50B, a crank arm 52A, 52B, and a bracket 54A, 54B. The distance sensors 30A, 30B are mounted to the respective portions of the frame 36A, 36B of the vehicle 10 by the respective brackets 54A, 54B and measure respective distances D1, D2 between the respective portions of the frame 36A, 36B and the solid axle 22. It is to be appreciated that since the dampers 28A, 28B are splayed with respect to one another, the distance D1 corresponding to the left rear wheel 14A (FIG. 1) of the vehicle 10 is not equal to the distance D2 corresponding to the right rear wheel 14B of the vehicle 10.

Although a rotary height sensor is illustrated, it is to be appreciated that the distance sensors 30A, 30B may be any type of distance sensor for measuring the respective distances D1, D2 between the respective portions of the frame 36A, 36B to the solid axle 22 such as, for example, linear distance sensors, optical distance sensors, and accelerometers. Some examples of linear distance sensors include linear potentiometers and string potentiometers. Furthermore, accelerometers may be placed upon the respective portions of the frame 36A, 36B as well as the dampers 28A, 28B to achieve a similar result. However, it is to be appreciated that the respective outputs of the accelerometers are integrated instead of derived to calculate damper velocity. The distance sensors 30A, 30B generate sensor signals indicative of the respective distances D1, D2 between the respective portions of the frame 36A, 36B and the solid axle 22, where the one or more controllers 34 receive the sensor signals from the distance sensors 30A, 30B.

Figure 6:
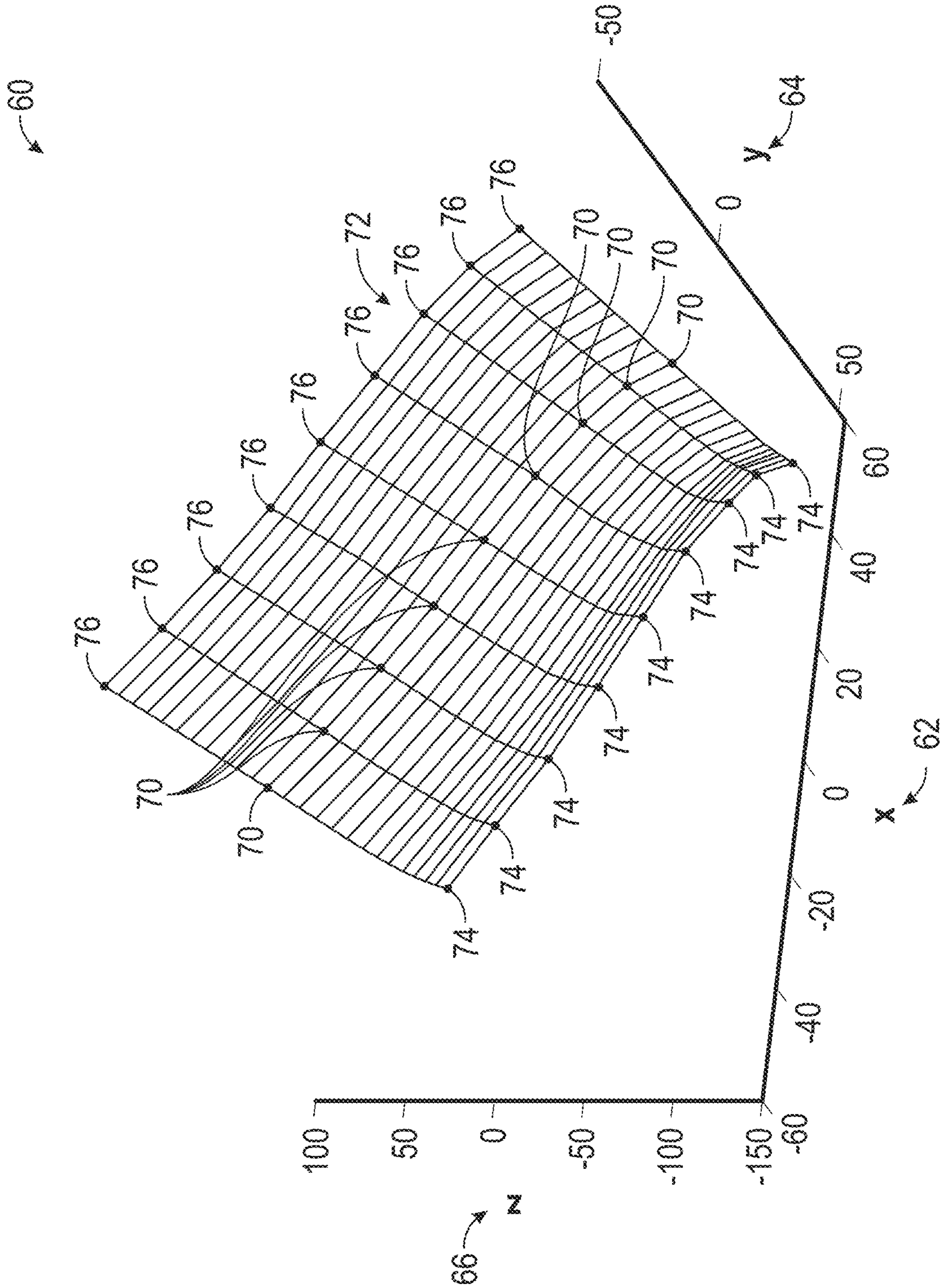
FIG. 6 illustrates an exemplary three-dimensional look-up table that is stored in memory of the one or more controllers shown in FIG. 3, according to an exemplary embodiment.

As explained below, the one or more controllers 34 determines a velocity of each damper 28A, 28B based on the sensor signals received by the pair of distance sensors 30A, 30B. FIG. 6 is an illustration of an exemplary three-dimensional look-up table 60 corresponding to one of the dampers 28A, 28B that are part of the solid axle suspension 20. In the non-limiting embodiment as shown in FIG. 4, the three-dimensional look-up table 60 is for the damper 28A corresponding to the left rear wheel 14A (FIG. 1), however, it is to be appreciated that a similar three-dimensional look-up table also exists with respect to the damper 28B corresponding to the right rear wheel 14B as well.

Referring to FIGS. 3, 4, and 6, the one or more controllers 34 access a pair of three-dimensional look-up tables 60 that each correspond to one of the dampers 28A, 28B, where each three-dimensional look-up table 60 defines a relationship between the respective distances D1, D2 measured by the distance sensors 30A, 30B and a respective damper length L1, L2 of the dampers 28A, 28B. That is, each three-dimensional look-up table 60 indicates a damper length L1, L2 for one of the dampers 28A, 28B based on the distance D1 measured by the distance sensor 30A corresponding to the left rear wheel 14A (FIG. 1) of the vehicle 10 as well as the distance D2 measured by the distance sensor 30B corresponding to the right rear wheel 14B of the vehicle 10. As seen in FIG. 4, the damper length L1, L2 represents a vertical distance between the upper mount 42A, 42B and the lower mount 44A, 44B of a respective one of the dampers 28A, 28B. It is to be appreciated that since the dampers 28A, 28B are splayed with respect to one another, the damper length L1 for the damper 28A corresponding to the left rear wheel 14A (FIG. 1) of the vehicle 10 is not equal to the damper length L2 for the damper 28B corresponding to the right rear wheel 14B of the vehicle 10.

The one or more controllers 34 store the three-dimensional look-up tables 60 corresponding to the pair of dampers 28A, 28B in memory. Alternatively, in another embodiment, the three-dimensional look-up tables 60 are stored in a database, where the one or more controllers 34 are in electronic communication with the database. It is to be appreciated that a single value generated by one of the distance sensors 30A, 30B may represent more than one damper length L1, L2 of a corresponding damper 28A, 28B. In other words, it is to be appreciated that the damper length L1, L2 of each damper 28A, 28B may not be determined solely on sensor signals generated by only one of the distance sensors 30A, 30B. For example, the damper length L1 of the damper 28A corresponding to the left rear wheel 14A (FIG. 1) may not be determined based solely on the sensor signals generated by the distance sensor 30A corresponding to the left rear wheel 14A.

Each three-dimensional look-up table 60 includes an x-axis 62, a y-axis 64, and a z-axis 66. The x-axis 62 and the y-axis 64 each correspond to the sensor signals from one of the pair of distance sensors 30A, 30B indicating the damper length L (FIG. 3) of one of dampers 28. In the example as shown in FIG. 6, the x-axis 62 of the three-dimensional look-up table 60 corresponds to the distance sensor 30A for the damper 28A corresponding to the left rear wheel 14A (FIG. 1) and the y-axis 64 of the three-dimensional look-up table 60 corresponds to the distance sensor 30B for the damper 28B corresponding to the right rear wheel 14B. The z-axis 66 of the three-dimensional look-up table 60 corresponds to the damper length L1, L2 (FIG. 4) of one of the dampers 28A, 28B. Although FIG. 6 illustrates the x-axis 62 corresponding to the distance sensor 30A for the damper 28A corresponding to the left rear wheel 14A (FIG. 1), the y-axis 64 corresponding to the distance sensor 30B for the damper 28B corresponding to the right rear wheel 14B, and the z-axis corresponding to the damper length L1 for the damper 28A, it is to be appreciated that the three-dimensional look-up table 60 is not limited to the configuration shown in FIG. 4 and the x-axis 62, the y-axis 64, and the z-axis 66 may correspond to other variables instead. For example, in another embodiment, the x-axis 62 may correspond to the distance sensor 30B for the damper corresponding to the right rear wheel 14B or the damper length L1.

Referring to FIGS. 2, 3, 4, and 6, the one or more controllers 34 receive sensor signals from the pair of distance sensors 30A, 30B indicating the respective distances D1, D2 between the respective portions of the frame 36A, 36B of the vehicle 10 and the solid axle 22. In response to receiving the sensor signals from the pair of distance sensors 30A, 30B, the one or more controllers 34 determine the respective damper lengths L1, L2 of the pair of dampers 28A, 28B by locating a value on each of the pair of three-dimensional look-up tables 60, where the value represents a respective damper length L1, L2 of one of the dampers 28A, 28B corresponding to the respective distances D1, D2 measured by the pair of distance sensors 30A, 30B. Once the respective damper length L1, L2 of the pair of dampers 28A, 28B is determined, the one or more controllers 34 then derive the damper length L1, L2 of each damper 28A, 28B with respect to time to determine a velocity corresponding to each of the pair of dampers 28A, 28B. It is to be appreciated that the one or more controllers 34 determines a requested damper output force for each of the pair of dampers 28A, 28B. The one or more controllers 34 then determine the value of a current signal that is transmitted to one the dampers 28A, 28B to generate the corresponding requested damper output force. The value of the current signal is determined based on the value of the requested output damper force and the instantaneous velocity corresponding to a subject one of the dampers 28A, 28B.

The three-dimensional look-up table 60 is determined based on a kinematic study where the solid axle suspension 20 is in a curb position, a compression position, and a rebound position of the vehicle 10. The kinematic study includes constraining and holding either the wheel assembly 32A corresponding to the left rear wheel 14A (FIG. 1) or the wheel assembly 32B corresponding to the right rear wheel 14B (FIG. 1) of the vehicle 10 stationary while the remaining wheel assembly 32B is articulated through an entire range of motion corresponding to the remaining wheel assembly 32B of the solid axle suspension 20 at predefined distance increments and repeating by then constraining and holding the remaining wheel assembly 32B stationary and articulating the other wheel assembly 32A for each of the curb position, the compression position, and the rebound position of the vehicle 10. It is to be appreciated that the kinematic study may be performed based on empirical data generated by testing the vehicle 10 in real life or, in the alternative, the kinematic study may be performed based on a computer simulation.

Figure 7:
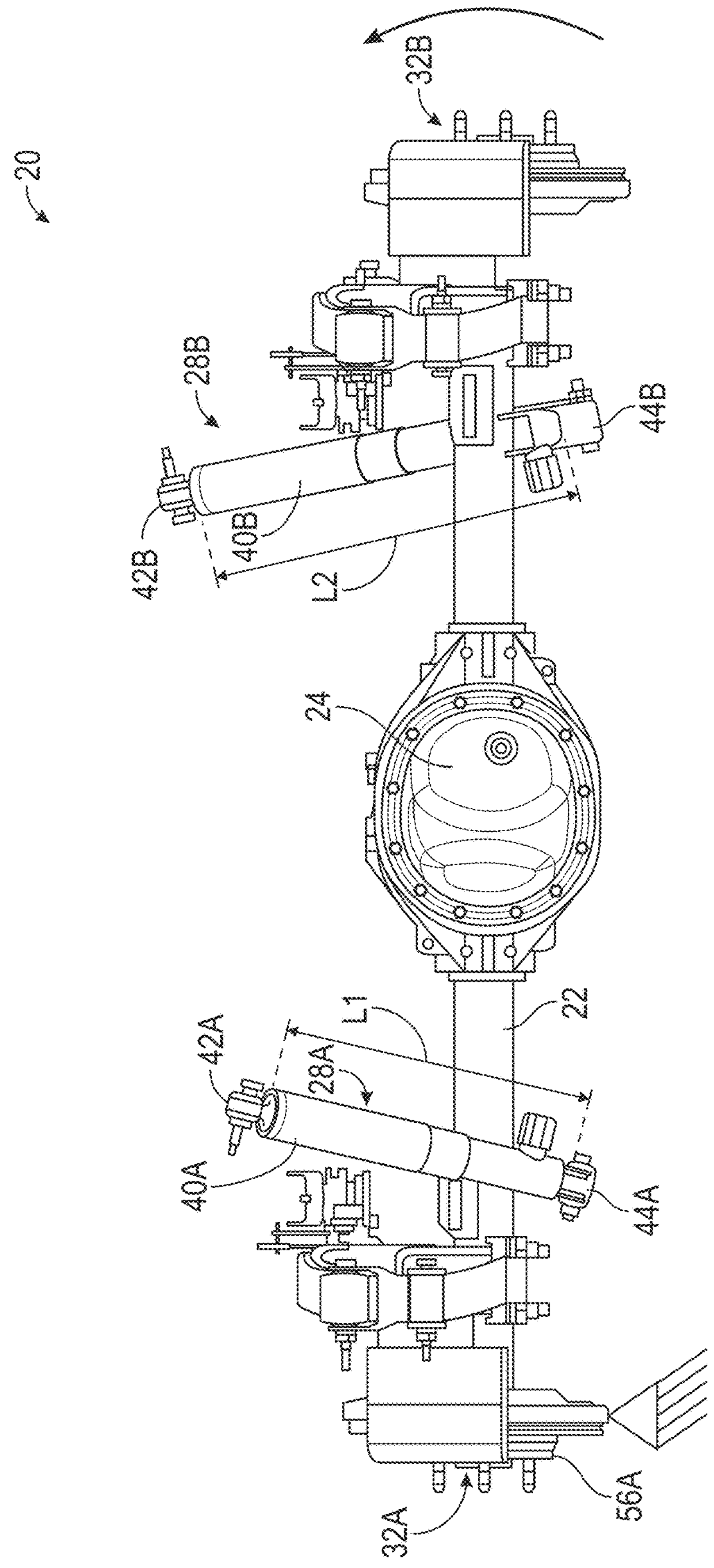
FIG. 7 is an illustration of the solid axle suspension in a curb position, according to an exemplary embodiment.

FIG. 7 is an exemplary illustration of the solid axle suspension 20 in the curb position where the wheel assembly 32A corresponding to the left rear wheel 14A (FIG. 1) is constrained and held stationary at a corresponding rotor 56A, while the wheel assembly 32B corresponding to the right rear wheel 14B is articulated through the entire range of motion corresponding to the wheel assembly 32B at the predefined distance increments. In one non-limiting embodiment, the predefined distance increments are about ten millimeters, however, it is to be appreciated that the predefined distance increments may be adjusted based on the specific application. The curb position of the vehicle 10 represents a position of the solid axle suspension 20 when the vehicle 10 is at rest on level ground with a full tank of fuel (if applicable), zero payload, and no passengers.

Referring to both FIGS. 6 and 7, data collected during the kinematic study at the curb position is represented by a plurality of centrally located data points 70 located along a three-dimensional surface plot 72 of the three-dimensional look-up table 60. The centrally located data points 70 of the three-dimensional look-up table 60 each represent a midpoint of the three-dimensional surface plot 72 with respect to the damper length L1 of the damper 28A (i.e., the z-axis 66 of the three-dimensional look-up table 60). The centrally located data points 70 of the three-dimensional surface plot 72 correspond to the damper length L1 of the damper 28A being constrained and held stationary at the curb position.

When in the compression position, the pair of dampers 28A, 28B are fully compressed and the damper length L1, L2 corresponding to each damper 28A, 28B is at the minimum value. Data collected during the kinematic study at the compression position is represented by a plurality of minimum data points 74 located along the three-dimensional surface plot 72 of the three-dimensional look-up table 60. The minimum data points 74 of the three-dimensional look-up table 60 each represent a minimum value of the three-dimensional surface plot 72 with respect to the damper length L1 of the damper 28A (i.e., the z-axis 66 of the three-dimensional look-up table 60). The minimum data points 74 of the three-dimensional surface plot 72 correspond to the damper length L1 of the damper 28A being constrained and held stationary at the fully compressed position.

When in the rebound position, the pair of dampers 28A, 28B are both fully expanded and the damper length L1, L2 corresponding to each damper 28A, 28B is at the maximum value. The rebound position represents when the wheels 12A, 12B, 14A, 14B (FIG. 1) of the vehicle 10 are no longer touching the ground. For example, the wheels 12A, 12B, 14A, 14B (FIG. 1) of the vehicle 10 are off the ground when the vehicle 10 is on a hoist. Data collected during the kinematic study at the rebound position is represented by a plurality of maximum data points 76 located along the three-dimensional surface plot 72 of the three-dimensional look-up table 60. The maximum data points 76 of the three-dimensional surface plot 72 correspond to the damper length L1 of the damper 28A being constrained and held stationary at the rebound position.

Referring generally to the figures, the disclosed system provides various technical effects and benefits. Specifically, the system provides an approach for robustly determining the velocity of each damper of a solid axle suspension based on sensor readings generated by two distance sensors that correspond to the left and right wheels of the vehicle. It is to be appreciated that the disclosed approach utilizes existing distance sensors, and therefore requires no rework of a vehicle's mechanical or electrical systems. Furthermore, the current approach does not require any additional hardware components, and only software changes are required to implement the disclosed system on an existing vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for determining a damper velocity in solid axle suspension for a vehicle including a frame, the system comprising:

a solid axle connecting a left wheel and a right wheel of the vehicle together;

a pair of dampers corresponding to the left wheel and the right wheel of the vehicle, wherein each damper defines a respective damper length;

a pair of distance sensors that each correspond to the left wheel and the right wheel of the vehicle, wherein the pair of distance sensors each generate sensor signals that are indicative of respective distances between respective portions of the frame of the vehicle and the solid axle; and one or more controllers in electronic communication with the pair of distance sensors, wherein the one or more controllers access a pair of three-dimensional look-up tables that each correspond to one of the dampers of the pair of dampers, wherein each three-dimensional look-up table defines a relationship between the respective distances measured by the pair of distance sensors and the respective damper length of each damper, and wherein the one or more controllers include one or more processors that execute instructions to:

receive, from the pair of distance sensors, the sensor signals indicating the respective distances between the frame of the vehicle and the solid axle;

in response to receiving the sensor signals, locate a value on each of the pair of three-dimensional look-up tables, wherein the value represents a respective damper length of one of the dampers corresponding to the respective distances measured by the pair of distance sensors; and derive the respective damper length of each damper with respect to time to determine a velocity corresponding to each damper.

2. The system of claim 1, wherein each three-dimensional look-up table is determined based on a kinematic study where the solid axle suspension is in a curb position, a compression position, and a rebound position of the vehicle.

3. The system of claim 2, wherein the kinematic study includes holding either a wheel assembly corresponding to the left wheel or a wheel assembly corresponding to the right wheel of the vehicle stationary while a remaining wheel assembly is articulated through an entire range of motion corresponding to the remaining wheel assembly at predefined distance increments.

4. The system of claim 3, wherein the predefined distance increments are about ten millimeters.

5. The system of claim 2, wherein the curb position of the vehicle represents a position of the solid axle suspension when the vehicle is at rest on level ground with a full tank of fuel, zero payload, and no passengers.

6. The system of claim 2, wherein the pair of dampers are fully compressed and the respective damper length corresponding to each damper is at a minimum value when the vehicle is in the curb position.

7. The system of claim 2, wherein the pair of dampers are both fully expanded and the respective damper length corresponding to each damper is at a maximum value in the rebound position.

8. The system of claim 1, wherein the pair of dampers are splayed non-symmetrically with respect to one another in an x-axis, a y-axis, and a z-axis of a vehicle coordinate system of the vehicle.

9. The system of claim 1, wherein the pair of distance sensors include one of the following: rotary height sensors, linear distance sensors, optical distance sensors, and accelerometers.

10. The system of claim 1, wherein the pair of dampers include one of the following: active dampers and semi-active dampers.

11. The system of claim 1, wherein the solid axle connects rear wheels of the vehicle together.

12. A system for determining a damper velocity in solid axle suspension for a vehicle including a frame, the system comprising:

a solid axle connecting a left rear wheel and a right rear wheel of the vehicle together;

a pair of dampers corresponding to the left rear wheel and the right rear wheel of the vehicle, wherein each damper defines a respective damper length;

a pair of distance sensors that each correspond to the left rear wheel and the right rear wheel of the vehicle, wherein the pair of distance sensors each generate sensor signals that are indicative of respective distances between respective portions of the frame of the vehicle and the solid axle; and one or more controllers in electronic communication with the pair of distance sensors, wherein the one or more controllers access a pair of three-dimensional look-up tables that each correspond to one of the dampers of the pair of dampers, wherein each three-dimensional look-up table defines a relationship between the respective distances measured by the pair of distance sensors and the respective damper length of each damper, and wherein each three-dimensional look-up table is determined based on a kinematic study where the solid axle suspension is in a curb position, a compression position, and a rebound position of the vehicle, and wherein the one or more controllers include one or more processors that execute instructions to:

receive, from the pair of distance sensors, the sensor signals indicating the respective distances between the frame of the vehicle and the solid axle;

in response to receiving the sensor signals, locate a value on each of the pair of three-dimensional look-up tables, wherein the value represents a respective damper length of one of the dampers corresponding to the respective distances measured by the pair of distance sensors; and derive the respective damper length of each damper with respect to time to determine a velocity corresponding to each damper.

13. The system of claim 12, wherein the kinematic study includes holding either a wheel assembly corresponding to the left rear wheel or a wheel assembly corresponding to the right rear wheel of the vehicle stationary while a remaining wheel assembly is articulated through an entire range of motion corresponding to the remaining wheel assembly at predefined distance increments.

14. The system of claim 13, wherein the predefined distance increments are about ten millimeters.

15. The system of claim 12, wherein the curb position of the vehicle represents a position of the solid axle suspension when the vehicle is at rest on level ground with a full tank of fuel, zero payload, and no passengers.

16. The system of claim 12, wherein the pair of dampers are fully compressed and the respective damper length corresponding to each damper is at a minimum value when the vehicle is in the curb position.

17. The system of claim 12, wherein the pair of dampers are both fully expanded and the respective damper length corresponding to each damper is at a maximum value in the rebound position.

18. The system of claim 12, wherein the pair of dampers are splayed non-symmetrically with respect to one another in an x-axis, a y-axis, and a z-axis of a vehicle coordinate system of the vehicle.

19. The system of claim 12, wherein the pair of distance sensors include one of the following: rotary height sensors, linear distance sensors, optical distance sensors, and accelerometers.

20. A vehicle including a solid axle suspension, comprising:

a frame;

a solid axle connecting a left rear wheel and a right rear wheel of the vehicle together;

a pair of dampers corresponding to the left rear wheel and the right rear wheel of the vehicle, wherein each damper defines a respective damper length;

a pair of distance sensors that each correspond to the left rear wheel and the right rear wheel of the vehicle, wherein the pair of distance sensors each generate sensor signals that are indicative of respective distances between respective portions of the frame of the vehicle and the solid axle; and one or more controllers in electronic communication with the pair of distance sensors, wherein the one or more controllers access a pair of three-dimensional look-up tables that each correspond to one of the dampers of the pair of dampers, wherein each three-dimensional look-up table defines a relationship between the respective distances measured by the pair of distance sensors and the respective damper length of each damper, and wherein each three-dimensional look-up table is determined based on a kinematic study where the solid axle suspension is in a curb position, a compression position, and a rebound position of the vehicle, and wherein the one or more controllers include one or more processors that execute instructions to:

receive, from the pair of distance sensors, the sensor signals indicating the respective distances between the frame of the vehicle and the solid axle;

in response to receiving the sensor signals, locate a value on each of the pair of three-dimensional look-up tables, wherein the value represents a respective damper length of one of the dampers corresponding to the respective distances measured by the pair of distance sensors; and derive the respective damper length of each damper with respect to time to determine a velocity corresponding to each damper.

* * * * *